US010132668B2

(12) United States Patent
Jamison

(10) Patent No.: US 10,132,668 B2
(45) Date of Patent: Nov. 20, 2018

(54) HELIXED ORIFICE ADJUSTABLE FEED ROLL

(76) Inventor: John Paul Jamison, Dickerson, MD (US)

(*) Notice: Subject to any disclaimer, the term of this patent is extended or adjusted under 35 U.S.C. 154(b) by 0 days.

(21) Appl. No.: 13/446,226

(22) Filed: Apr. 13, 2012

(65) Prior Publication Data
US 2012/0261440 A1 Oct. 18, 2012

Related U.S. Application Data

(60) Provisional application No. 61/475,146, filed on Apr. 13, 2011.

(51) Int. Cl.
*A01C 7/08* (2006.01)
*G01F 11/24* (2006.01)

(52) U.S. Cl.
CPC ................... *G01F 11/24* (2013.01)

(58) Field of Classification Search
CPC ......... A01C 19/00; A01C 7/127; A01C 7/123; A01C 7/081; A01C 7/04; A01C 7/06; A01C 7/12; G01F 11/24
USPC ........ 111/174, 177, 178, 182, 922; 222/414, 222/561, 548, 407, 177, 410
See application file for complete search history.

(56) References Cited

U.S. PATENT DOCUMENTS

| | | | | |
|---|---|---|---|---|
| 169,283 A | * | 10/1875 | Morgan | G01F 11/18 222/305 |
| 310,228 A | * | 1/1885 | Riter | A01C 7/123 222/299 |
| 492,782 A | * | 3/1893 | Henry | F16K 5/0414 251/310 |
| 1,134,894 A | * | 4/1915 | Newton | A01C 7/04 111/178 |
| 1,691,563 A | * | 11/1928 | Burger | 222/236 |
| 1,712,797 A | * | 5/1929 | Johnston et al. | 222/268 |
| 1,783,032 A | * | 11/1930 | Ayers | 111/51 |
| 2,777,613 A | * | 1/1957 | Hartje | A01C 7/102 222/268 |
| 3,489,321 A | * | 1/1970 | Kirschmann | A01C 7/121 111/36 |
| 3,581,950 A | * | 6/1971 | Miller | 222/615 |
| 4,131,221 A | * | 12/1978 | Yeager | 222/624 |
| 4,261,593 A | * | 4/1981 | Yeager | 280/415.1 |
| 4,408,704 A | * | 10/1983 | Steilen | A01C 7/123 111/177 |

(Continued)

FOREIGN PATENT DOCUMENTS

| | | |
|---|---|---|
| RU | 2226760 C2 | 4/2004 |
| RU | 2384040 C1 | 3/2010 |

OTHER PUBLICATIONS

FIPS Russia Examination Report, dated Jun. 25, 2012.

*Primary Examiner* — Charles P Cheyney
(74) *Attorney, Agent, or Firm* — Symbus Law Group, LLC; Clifford D. Hyra

(57) ABSTRACT

Example embodiments are directed towards systems and methods for dispensing feed. In one example embodiment, the system may include a feed cup configured to receive feed and a feed roll having helical flutes. In an example embodiment, the feed roll is configured to be disposed in different positions to adjust a size of an orifice within the feed cup, wherein a flow of dispensing feed is adjusted based on the positioning of the feed roll and an angle of the helical flutes.

13 Claims, 11 Drawing Sheets

(56) References Cited

U.S. PATENT DOCUMENTS

| | | | | |
|---|---|---|---|---|
| 4,587,909 | A | * | 5/1986 | Bailey .................... A01C 7/087 111/67 |
| 4,609,131 | A | * | 9/1986 | Tieben ..................... A01C 7/16 111/35 |
| 4,928,858 | A | * | 5/1990 | Tite ........................ A01C 7/123 111/34 |
| 5,003,894 | A | * | 4/1991 | Lafferty ................. A01C 7/087 111/170 |
| 5,024,173 | A | * | 6/1991 | Deckler ........................ 111/178 |
| 5,078,066 | A | * | 1/1992 | Lafferty ................... A01C 7/00 111/170 |
| 5,878,679 | A | * | 3/1999 | Gregor et al. ................. 111/174 |
| 5,937,773 | A | * | 8/1999 | Maddoux et al. ............ 111/173 |
| 5,996,515 | A | * | 12/1999 | Gregor et al. ................ 111/174 |
| 6,598,548 | B2 | * | 7/2003 | Lempriere .................... 111/178 |
| 7,100,522 | B2 | * | 9/2006 | Mayerle ................... A01C 7/12 111/177 |
| 7,428,874 | B2 | * | 9/2008 | Jones et al. ................... 111/182 |
| 8,434,416 | B2 | * | 5/2013 | Kowalchuk ............ A01C 7/126 111/178 |
| 2008/0163807 | A1 | | 7/2008 | Dean et al. |
| 2012/0174844 | A1 | * | 7/2012 | Friggstad ..................... 111/175 |

* cited by examiner

HELIXED ORIFICE ADJUSTABLE FEED ROLL

This application claims priority to U.S. provisional patent application Ser. No. 61/475,146 filed Apr. 13, 2011, which is hereby incorporated herein in its entirety.

FIELD OF THE INVENTION

Example embodiments relate to agriculture applications, systems and methods. More specifically, example embodiments relate to precision metering seed dispensers.

BACKGROUND

Conventional planters use systems and methods that dispense feed or seeds at inconsistent rates, and thus conventional planters fail to meet the growing demands of farming. Conventionally, seed dispensers use feed rolls comprising horizontal flutes that dispense seeds based on a speed of a corresponding planter.

Feed rolls including horizontal flutes dispense feed at irregular or inconsistent rates such that the dispenser may dispense a lot of seeds during a first period, followed by a period where only a few seeds are dispensed. This may lead to poor crop spacing. Seeds dispensed in a high-density do not receive proper and adequate nutrients. Accordingly, for plants to receive proper nutrients, seeds must have a sufficient amount of space between them. Thus, with conventional planters, it is infeasible to have proper spacing between seeds because the seeds are dispensed inconsistently.

Needs exist for improved feed rolls and associated parts for orifice-driven planters and other dispensing machinery.

SUMMARY

It should be understood that both the following summary and detailed description are exemplary and explanatory and are intended to provide further explanation of claimed embodiments. Neither the summary, nor the following description is intended to define or limit the scope of the embodiments.

Feed rolls are known structures having generally cylindrical bodies and projecting flutes that push feed out of a feed cup when the feed roll is rotated. A new system for dispensing feed includes a feed cup configured to receive and dispense feed and a feed roll having helical flutes. The feed roll is configured to move between different positions to adjust a size of an orifice within the feed cup and a flow of dispensing feed from the feed cup is proportionate to the size of the orifice. The system may also include a freely rotatable ring secured to the feed cup and configured to receive the feed roll, where the feed roll slides through the ring to move between positions and this movement between positions rotates the ring due to the helical flutes. The ring may have a plurality of notches, each of the notches corresponding to one of the helical flutes. An angle of each notch may correspond to an angle of each corresponding helical flute. The angle of the helical flutes indicates the angle between each flute and the horizontal position of a standard feed roll flute. So, a ninety degree flute angle would be circumferential around a cylindrical feed roll. The angle of a ring notch therefore indicates the angle of the thickness of the notch away from parallel to the ring's major axis. A ring with a notch cut straight through its thickness has notch edges parallel to the major axis, whereas a ring with notches cut at the angle of helical flutes through its thickness has notch edges at the same angle as the flutes.

The flow of dispensing feed may be proportional to a rotational speed of the feed roll. The system may also include interchangeable gears, where changing a first gear to a second gear adjusts the rotational speed of the feed roll. The feed roll may be configured to replace an existing feed roll having straight horizontal flutes in an existing feed cup and to mate and interact with an existing ring in the feed cup having straight notches. The feed cup may also include a removable shield configured to cover a portion of the feed roll and prevent flow of feed into the feed roll in the direction opposite the direction of rotation of the feed roll. A plurality of the helical flutes may dispense feed simultaneously, which occurs for example if multiple flutes are crossing a dispensing ledge and pushing feed over the dispensing ledge at the same time. A first one of the plurality of helical flutes may terminate directly opposite where a second one of the plurality of helical flutes begins on the feed roll. The feed roll may be configured such that each flute intersects the ring directly opposite where another flute begins on the feed roll when the feed roll is inserted ¼, ⅓, ½, ⅔ or ¾ of the way in to the feed cup.

In a new method for dispensing feed, feed is received within a feed cup, the feed is disposed between helical flutes of a feed roll, the feed roll is positioned within the feed cup to adjust the size of an orifice within the feed cup, and feed is dispensed at a rate proportional to the size of the orifice by rotating the feed roll. The feed roll may be moved within the feed cup by sliding it through a ring coupled to the feed cup and thereby rotating the ring. The ring may have a plurality of notches, each of the notches corresponding to one of the helical flutes. An angle of each notch may correspond to the angle of each helical flute.

The rotational speed of the feed roll may be adjusted to change the rate of flow of dispensing feed. An interchangeable gear coupled to the feed roll may be changed, thereby adjusting the rotational speed of the feed roll. The feed cup may be retrofitted by replacing an existing feed roll having horizontal flutes in the feed cup with the feed roll having helical flutes. A shield may be attached to the feed cup to cover a portion of the feed roll and prevent flow of feed into the feed roll in an undesired direction. The dispensing feed may include dispensing feed from a plurality of the helical flutes simultaneously. A first of the helical flutes of the feed roll may terminate opposite where a second of the helical flutes begins on the feed roll. The feed roll having helical flutes may be slid through an existing ring in the feed cup. An existing ring in the feed cup may be replaced with a ring having notches corresponding in shape with the helical flutes of the feed roll. The feed roll may be replaced with a second feed roll having helical flutes and thereby increasing the rate of feed dispensing, where the second feed roll has less total flute volume. The feed roll may be replaced with a second feed roll having helical flutes, thereby increasing regularity of feed dispensing with various feed roll positions, where the flutes of the second feed roll are at a greater angle than the flutes of the feed roll. The feed roll may be replaced with a second feed roll comprising helical flutes to accommodate larger feed size, where the flutes of the second feed roll are spaced further apart than the flutes of the feed roll.

BRIEF DESCRIPTION OF THE DRAWINGS

The features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION OF THE DRAWINGS

Figure 1:
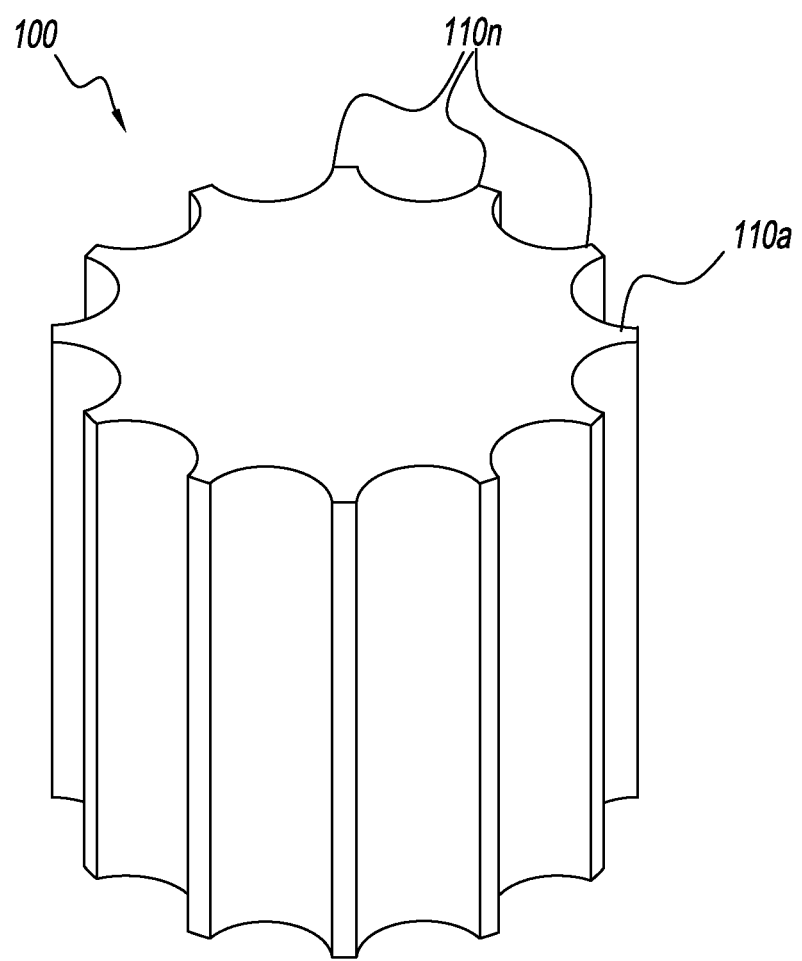
FIG. 1 depicts a feed roll with horizontal flutes.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments relate to a feed roll device that may be retro-fitted onto a variety of orifice drive agricultural machinery. More specifically, example embodiments disclosed herein describe a feed roll device with helical flutes coupled with a feed cup. By replacing a feed roll device with horizontal flutes with a feed roll device with helical flutes, the feed cup coupled to the helical feed roll device may more evenly/consistently distribute or dispense a flow of feed. A helical feed roll may thereby increase the production of small grains by increasing the efficiency of planters. The helical feed roll may be retrofitted into a variety of orifice driven agricultural machinery and also to improve new models. The helical feed roll device may therefore allow for a more efficient product, and also increase the capability of machines, devices and systems that have already been manufactured. In some embodiments, a lubricant such as graphite is used to break surface tension between the seeds or other feed and prevent clumping at low speeds. The tendency towards clumping at low speeds and need for lubricant can vary depending on the grain or other feed being dispensed, among other factors.

To further control, adjust or modify the rate of flow of seed being distributed from the feed cup, the feed roll device may be moved in and out of the feed cup, the result being that the feed roll device may be positioned at various depths within the feed cup. Accordingly, based on the amount of the feed roll device positioned within the feed cup, different amounts of feed may contact the feed roll device, thus changing the rate of flow of feed traversing the feed cup. The angle of the helical flutes and/or the revolution of the feed roll may be further adjusted to control the flow of the feed being dispensed from a feed cup. In at least one embodiment, the feed flow being dispensed from the feed cup may be based on a size of seeds being planted.

FIG. 1 depicts an example embodiment of a feed roll device 100 with horizontal or straight flutes 110*n*. A feed roll device 100 with horizontal flutes 110*n* may be used in an agricultural device to dispense seeds out of a feed cup. As feed roll device 100 turns, feed may be dispensed from flutes 110*n*. However, more feed may be located within the valleys between individual flutes, than near the peaks of the flutes 110*a*, 110*n*. Each time as a flute passes horizontal dispensing ledge, it drops a batch of seeds out of the bottom of the feed cup at the same time, resulting in bunching and poor spacing.

Feed roll device 100 may be disposed within a feed cup (not shown) at a fixed or permanent position. Also, feed roll device 100 may turn or be rotated at a speed corresponding to the speed at which the associated planter is moving.

Therefore, the feed roll device 100 will dispense feed at a speed that is proportional to the speed of the planter. However, if the planter is moving along terrain that requires constant stopping and going, then feed roll device 100 may dispense many seeds in close proximity to one another. The slower the planter and feed roll are moving, the greater the density of resulting bunches.

Feed roll device 100 with horizontal flutes 110$n$ may dispense seeds unevenly, disproportionately, or irregularly. In other words, horizontal flutes 110$n$ may drop some seeds in close proximity of each other, while other seeds may be dropped farther apart. Thus, seeds that are dispensed from a feed roll device 100 may be dispensed or dropped too close to one another. Accordingly, the seeds from feed roll device 100 may not get a required, desired or necessary amount of nutrients.

Figure 2:
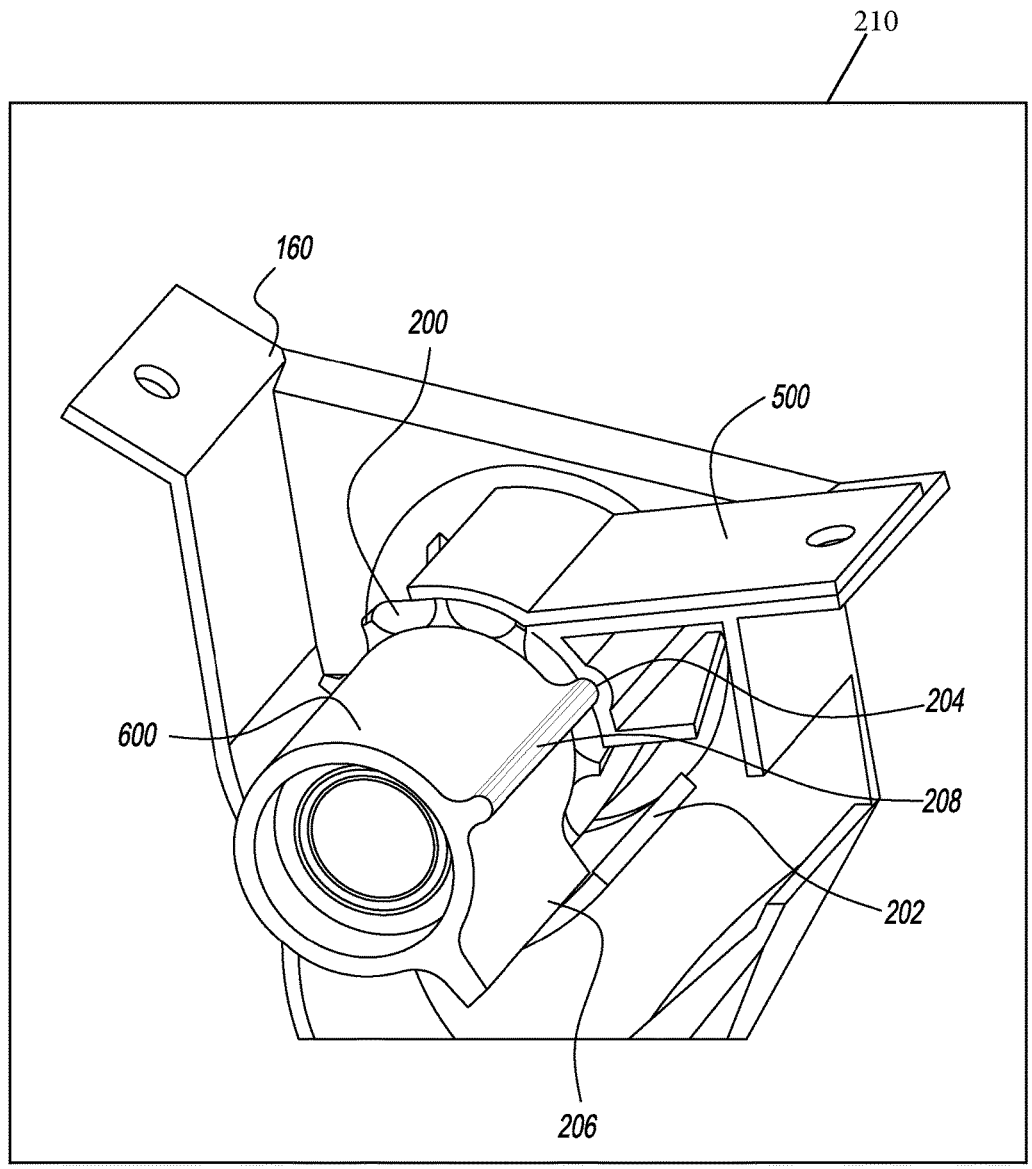
FIG. 2 depicts a feed cup with a feed roll including helical flutes according to an example embodiment.

FIG. 2 depicts shield 500 and feed roll device 200 coupled within a feed cup 160 and mounted on an agricultural machine 210 (depicted schematically). As feed enters the feed cup 160, the feed is protected from flowing in a wrong or backward direction through feed roll device 200 by shield 500. Feed comes into contact with feed roll 200 at the start of a cycle of feed roll 200 and is dispensed from the feed cup 160 at the end of a cycle. As the feed roll turns, it pushes seeds over the ledge 202, allowing them to drop out the bottom of the feed cup. Therefore, the feed roll 200 may adjust or modify the flow of the feed traversing and being dispensed from feed cup 160. More specifically, and as discussed below, the flow of feed is dispensed from feed cup 160 may be based on the shape, positioning, and speed that feed roll 200 is rotating at. As a note, shield 500 will be discussed in more detail in reference to FIG. 5.

In alternative embodiments, shield 500 is not used. Existing feed cups already have elements designed to prevent backward flow into the feed roll 200, however the helical design of the present feed roll is somewhat more prone to backward flow depending on the angle of the helical flutes and of the feed cup/planter (i.e. depending on terrain), as seed may enter a flute and run backward along its length for some distance. However in most embodiments the flutes are not at such a severe angle as to require any additional shielding. In non-retrofit embodiments, built-in feed cup shielding may simply be made longer that in a standard feed cup, rather than attaching a separate shield 500 to the built-in shielding.

This figure also clearly shows the bushing 600. The bushing 600 is fixed in position in the feed cup by projection 208 and slot 204 in feed cup 160 (or other fixation structure) and does not rotate. Stopper projection 206 prevents any seed from passing the portion of the ledge 202 the bushing covers and being dispensed. As feed roll 200 moves in and out of the feed cup, the bushing 600 does the opposite—if the feed roll is fully inserted the bushing is fully removed from the feed cup, while if the feed roll is fully removed from the feed cup the bushing is fully inserted and blocks the entire feed cup.

Figure 3:
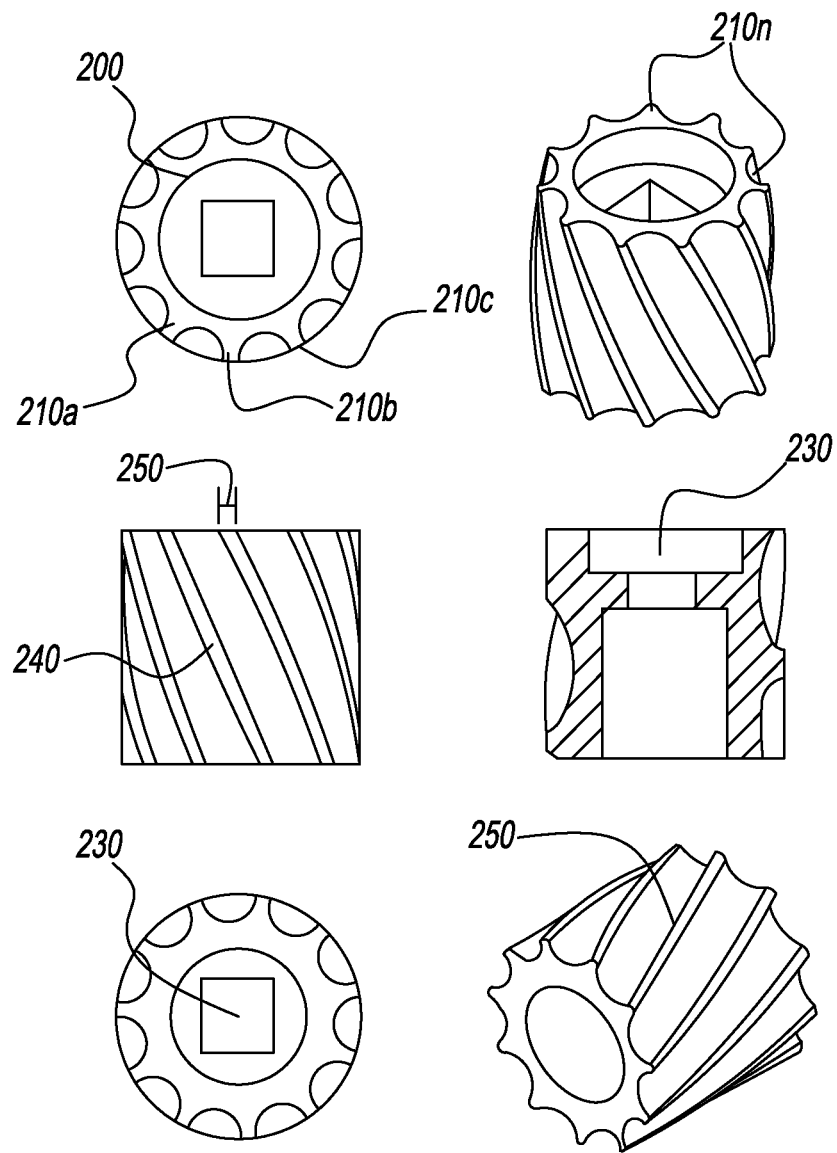
FIG. 3 depicts various views of a feed roll with helical flutes according to an example embodiment.

FIG. 3 depicts various views of a feed roll device 200 with helical flutes 210$n$. Feed roll device 200 may be coupled to a feed cup (as shown in FIG. 2) to dispense feed with a constant flow. As the helixed feed roll device 200 turns or rotates, multiple helical flutes 210$a$ and 210$b$ dispense feed simultaneously (i.e. multiple flutes cross the ledge 202 at the same time). In some embodiments, as one of the helical flutes 210$a$ is finishing crossing the ledge 202 and dispensing its seeds, an adjacent helical flute 210$c$ is crossing the ledge and starting to dispense its seeds. Thus, by having one flute terminate opposite the feed roll from where another flute begins, a constant flow rate may be achieved.

Accordingly, this succession may cause a consistent, constant, and/or uniform flow from the feed cup, and this may limit, reduce or prevent uneven distribution of feed being dispensed from the feed cup.

In at least one embodiment, feed roll 200 may be coupled to a feed cup via first slot 230. The feed cup is orifice driven, so feed roll 200 may also be moved/slid in and out of the feed cup, such that to adjust the feed being dispensed from a feed cup a different amount of the feed roll 200 may be positioned or disposed within the feed cup. In other words, feed roll 200 may move along a linear axis inside and outside of the feed cup to adjust or modify the position of feed roll 200 within the feed cup. Accordingly, based upon the positioning of feed roll 200 within the feed cup, varying amounts of the feed in the feed cup may come into contact with the feed roll 200. In other words, the more feed roll 200 that is within the feed cup, the more feed contacts feed roll 200 (and the less feed contacts bushing 600). Therefore, by adjusting the amount of feed roll 200 that is within the feed cup, the flow of material dispensed from the feed cup may be adjusted. Furthermore, for different types of feed it may be required or desired that feed roll 200 is located or positioned at specific positions within feed cup 200. For example, the desired volume flow rate may be lower for smaller seeds, to maintain appropriate spacing.

Orifice-driven planters and other machines have a number of advantages over machines where the flow rate must be adjusted hydraulically or by changing gears. An orifice-fed machine is infinitely adjustable and can be simply mechanically adjusted by hand by the use of a lever. The lack of complex machinery also allows a user to visually see the feed cup and feed roll and determine if seed is coming out, if a tube is blocked, if the feed roll is spinning, etc. They are reliable at high rates of flow.

Each of the helical flutes 210$n$ may have the same angle 240. The angle 240 of the helical flutes 210$n$ may indicate an angle that each helical flute 210$n$ is slanted within feed roll 200. Based on the angle 240 of the helical flutes 210$n$, the continuous feed dispersed from the feed cup may be disrupted or interrupted if the feed roll 200 is moved out of the feed cup a certain distance. This is because the number of helical flutes dispensing seeds decreases as less of feed roll 200 is inside the feed cup. For example, if helical flutes 210$n$ are angled such that three flutes are dispensing seeds at the same time if feed roll 200 is completely inside the feed cup (the first flute terminates opposite where the third flute begins), if feed roll 200 is moved out of the feed cup at a certain distance (½ of its length), only two flutes will be dispensing seeds simultaneously. If the feed roll is moved an intermediate distance, sometimes three flutes will be dispensing and sometimes only two, creating a slightly irregular flow. Thus, the amount of feed roll 200 disposed within the feed cup may be based on the angle 240 of the helical flutes 210$n$. Accordingly, to adjust the flow of feed being dispensed from a feed cup, the angle 240 of each of the helical flutes 240 may be adjusted.

The thickness 250 of each helical flute 210$n$ may indicate the width of a peak of a helical flute 210$a$. If a feed roll has a high angle 240, and the thickness 250 of the helical flutes 210$n$ is not adjusted, helical flutes 210$n$ may take up a greater portion of the surface area of the feed roll 200. Thus, the overall flow of feed dispensed from feed roll 200 may be reduced or limited, while the volume of the feed roll 200 may be increased.

To adjust the flow of seeds dispensed from feed roll 200, the thickness 250 of the helical flutes 250$n$ may be adjusted to increase or decrease the surface area of feed roll 200. For example, to increase the overall flow from feed roll 200, fewer helical flutes 210$n$ may be used, the thickness of the helical flutes 210$n$ may be decreased, the circumference of feed roll 200 may be increased, and/or the length of feed roll 200 may be increased, with corresponding adjustments to the feed cup and ring.

If the angle 240 of the helical flutes 210$n$ is high, and if the thickness 250 of the flutes 210$n$ is reduced accordingly to reduce the surface area taken up by the flutes 210$n$ to allow for an increased or greater flow rate, the space between each of the flutes 210$n$ may be reduced. This tends to increase the number of flutes dispensing seed at any given time and helps to maintain a regular flow as the feed roll is withdrawn from the feed cup. However, if the channel for feed to be received within a helical flute 210 is reduced, the amount of material captured by the feed roll 200 may also be reduced, particularly for larger feed. Thus, the flow of feed being dispensed by feed roll 200 may be reduced over a given period of time. Therefore, the angle 240 of the flutes 210$n$, as well as their width, shape, and material being dispensed may be adjusted or modified to achieve a desired or required flow.

Feed roll 200 may have a slot 230 configured to receive a shaft that may transfer power to feed roll 200, thereby enabling feed roll 200 to turn. Accordingly, slot 230 may rotate or turn at a speed based on the revolution speed of the shaft. As will be discussed later with reference to FIG. 6, gears may be coupled with the shaft. Thus, the rotational speed of the shaft may be adjusted independent of the speed of a planter.

Figure 4:
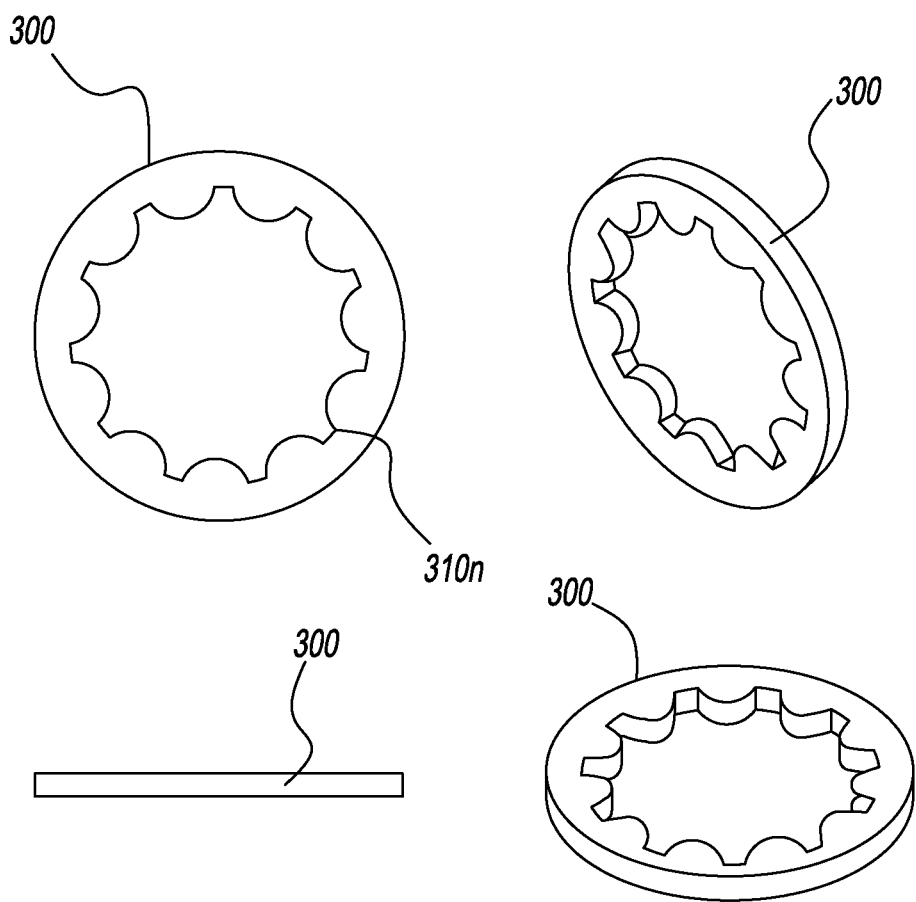
FIG. 4 depicts various views of a ring that is configured to be coupled with a feed roll according to an example embodiment.

FIG. 4 depicts various views of a ring 300 that is configured to receive feed roll 200. Ring 300 may have a plurality of indentations or notches 310$n$. Each of the notches 310$n$ within ring 300 may correspond to one of the helical flutes 210$n$ of feed roll 200. Accordingly, ring 300 may hold and turn with feed roll 200.

Ring 300 may also act as a bearing configured to restrict, confine or control the movement of feed roll 200 along a linear axis. Accordingly, if feed roll 200 is desired or required to be disposed in a different position within the feed cup, feed roll 200 may travel through ring 300. In other words, as feed roll 200 is adjusted in or out of the feed cup to change the flow of feed being dispensed from the feed cup, ring 300—and not feed roll 200—will spin. Thus, due to helical flutes 210$n$ and corresponding notches 310$n$, the feed roll may be adjusted to any position within or outside the feed cup regardless of whether the planter is in motion.

In at least one embodiment, ring 300 may be modified when retro-fitting feed roll 200 to an existing planter and corresponding feed roll. Accordingly, new ring 300 may be adjusted such the notches 310$n$ correspond to helical flutes of a feed roll. In at least one embodiment, notches 310$n$ may be angled to correspond to the angle of the helical flutes, such that each of the notches 310$n$ is angled at a same degree of angle as helical flutes within a feed roll. In other embodiments, the new feed roll may be retrofitted into an existing feed cup and existing ring. In such a case, the helical flutes of the feed roll must be designed to fit within the existing ring. This requires a matching number of flutes, and also a flute thickness and angle that permits the flutes to extend through the notches 310$n$ without binding, which is purely a geometric function of the ring's thickness and notch width (at various points) and the thickness (at corresponding points) and angle of the flutes. Flutes at high angles may have a tendency to bind in existing rings without angled notches, and thus in some embodiments where highly-angled flutes are utilized, replacement rings with angled notches are also used.

Figure 5:
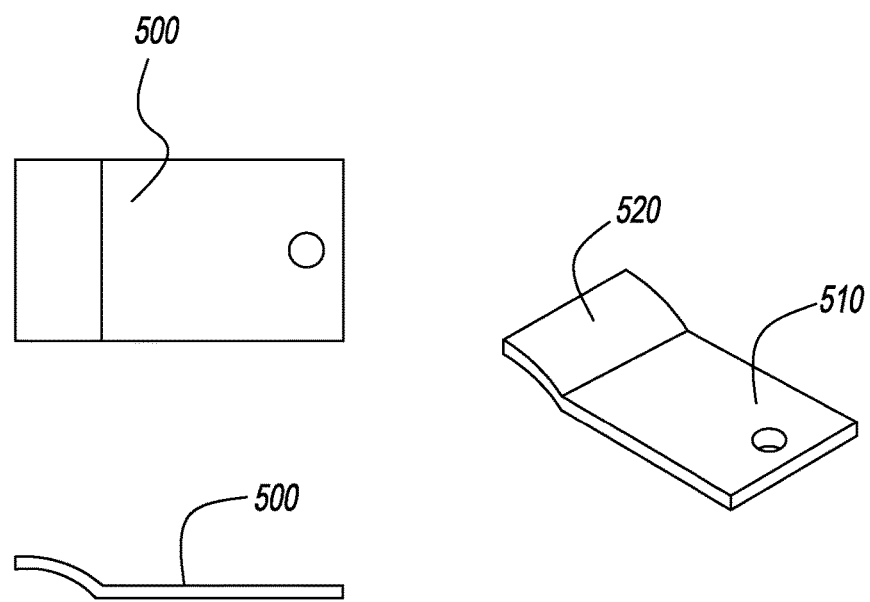
FIG. 5 depicts various views of a shield for a feed cup according to an example embodiment.

FIG. 5 depicts various views of a shield 500 configured to control the direction of feed entering a hopper of a feed cup. Shield 500 may include a substantially flat portion 510 and a curved portion 520. Shield 500 may be configured to cover a top portion of feed roll 200 while feed roll 200 is disposed within a feed cup. Accordingly, shield 500 may be utilized such that there is no backflow for feed disposed within one of the helical flutes 210$n$ while feed roll 200 is rotating or turning. In other words, by shield 500 covering a portion of feed roll 200 no seeds will flow in the wrong direction along a helical flute.

More so, the length of flat portion 510 and curved portion 520 may be based on the circumference of the feed roll 200. The width of the flat portion 510 and may be based on a width of the feed cup. Further, the curve of curve portion 520 may be based on the circumference of feed roll 200, such that the curve portion 520 has the same degree of arc as feed roll 200.

Figure 6:
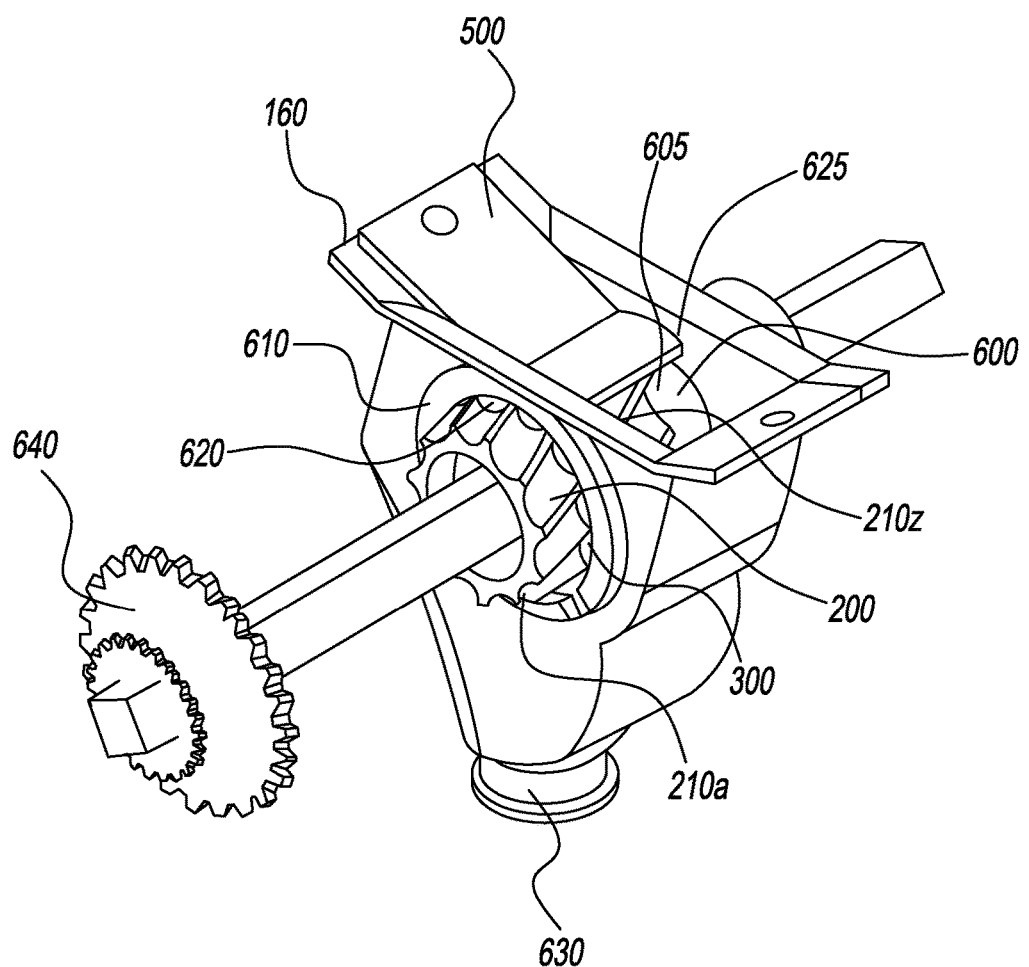
FIG. 6 depicts a perspective view of a feed cup according to an example embodiment.

FIG. 6 depicts an example embodiment of feed cup 160, feed roll 200, ring 300, shield 500, top surface 625 and bottom surface 630. Feed cup 160 may receive feed at a top surface 625. Then feed may come into contact with shield 500 and feed roll 200. Feed entering feed roll 200 may be received by one of the helical flutes 210$n$. When helical flute 210$n$ comes to an end of the cycle, the helical flute 210$a$ may dispense the seed out of bottom surface 630 as discussed with reference to FIG. 2.

Bushing 600 may be on a first side 605 of feed cup 160 and adjacent to feed roll 200. Further, bushing 600 may be configured to keep feed from exiting the feed cup 160. On the second side 610 of feed cup 160, there may be hole 620. Ring 300 may be disposed or positioned within hole 620. In at least one embodiment, an outer circumference of ring 300 may have a slot or depressed portion that is configured to couple within hole 620. The ring 300 may be rotatably attached to the feed cup in various fashions. For example, the ring may simple sit in the hole and a lip around both sides of the hole may secure the ring, allowing it to rotate but not to come out of the hole.

In at least one embodiment, one of the helical flutes 210$a$ may be dispensing a seed out of a bottom surface 630 of feed cup 160, while another helical flute 210$z$ is receiving a seed to be dispensed at the end of the cycle.

Based on the size of the feed, the speed that feed roll 200 turns and the positioning of feed roll 200 may be adjusted so a constant flow of feed is being dispensed from feed cup 160. For example, for a particular type of feed (i.e., soybeans), feed roll 200 may be positioned such that ¼ to ⅓ of feed roll 200 is positioned within feed cup 160 to limit the volumetric flow rate. However, depending on the design of the feed roll being used, drawing out too much of the feed roll may reduce the regularity of the flow. To counteract that effect, feed roll 200 may be coupled to a gear 640 with a low range gear (i.e., slowing the rotational speed of feed roll 200). This allows feed roll 200 to be inserted twice as far into feed cup 160 while maintaining the same low rate of flow. In other words, if feed roll 200 is rotating at a slower speed, more of feed roll 200 may be positioned within the feed cup 160 to maintain a constant flow of feed being dispensed out of bottom surface 630. Alternatively, the feed roll design (number and thickness/height/shape of flutes, distance between flutes, angle of flutes, feed roll circumference) may be modified to counteract that effect, for example if the machine being used lacks such gearing. In some embodiments, feed rolls may be swapped out depending on the type of feed/grain being dispensed.

Figure 7:
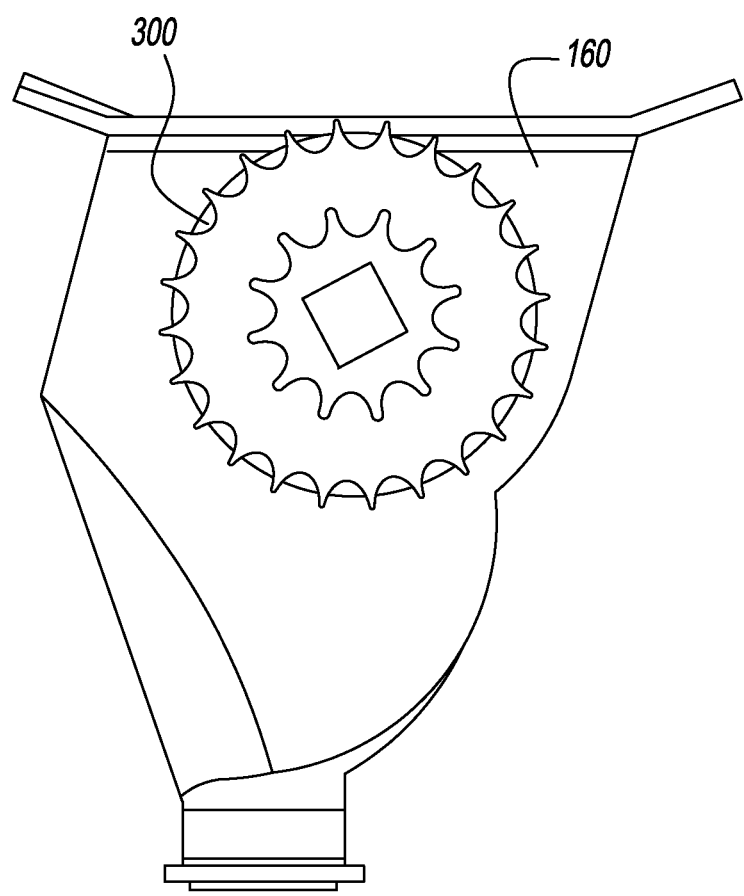
FIG. 7 depicts a side view of a feed cup according to an example embodiment.
Figure 8:
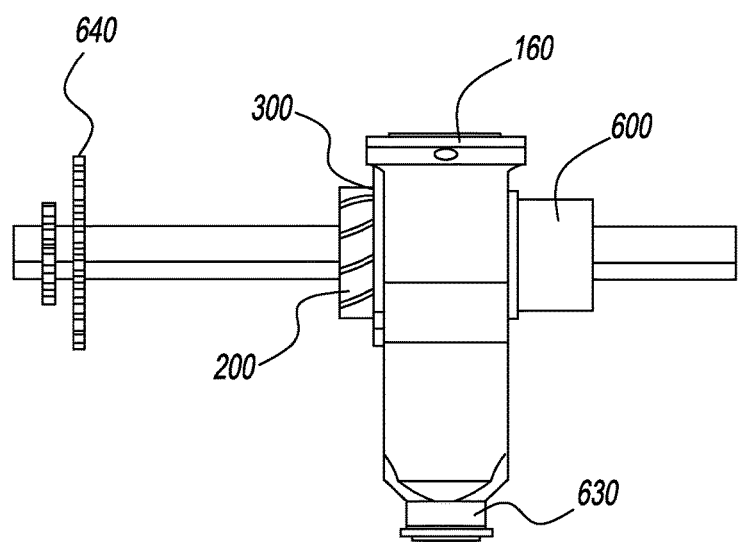
FIG. 8 depicts a front view of a feed cup according to an example embodiment.

FIGS. 7-8 depicts various views of a feed cup. More specifically, FIG. 7 depicts a side view of a feed cup according to an example embodiment, and FIG. 8 depicts a front view of a feed cup according to an example embodiment.

Figure 9:
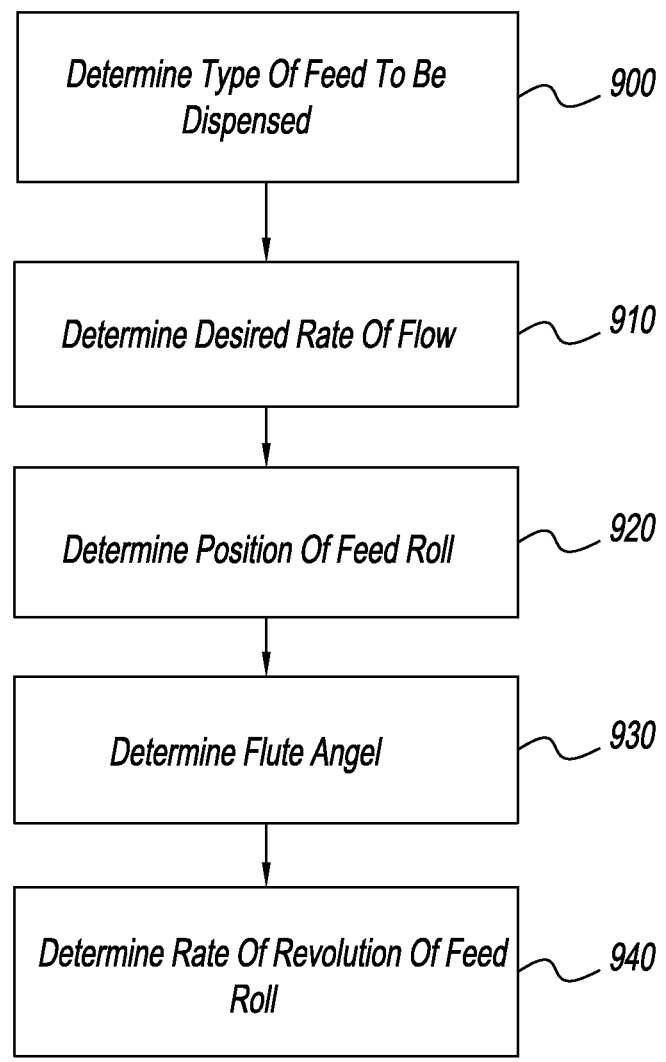
FIG. 9 depicts a flow diagram presenting how to modify or adjust the flow of feed dispensing from a feed cup according to an example embodiment.

FIG. 9 depicts a flow diagram presenting how to modify or adjust the flow of feed dispensed from a feed cup according to an example embodiment.

In 900, the type of feed to be dispensed may be determined. In at least one embodiment, different categories of feed may be grouped based on the size or shape of the feed.

In 910, a desired flow to dispense feed may be determined. For example, the flow rate may be based on a desired distance between seeds that are dispensed, or an amount of feed desired within a certain area.

In 920-940, the flow of the dispensed feed may be adjusted by the position of a feed roll within an orifice of a feed cup, the angle of flutes of a feed roll, and the rate of revolution of the feed roll. Each of the above parameters may be independently adjusted. However, a change in each of the parameters may cause the flow of feed being dispensed to change.

Figure 10A:
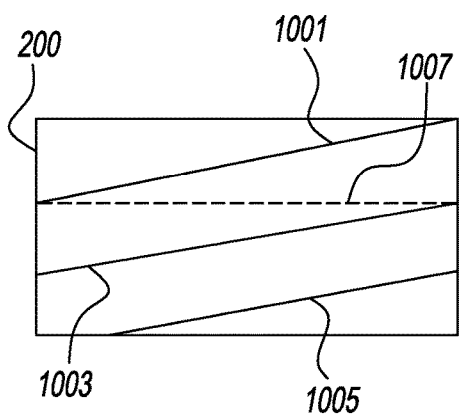
FIGS. 10A-10D illustrate different feed roll flute spacing and angle designs.

FIGS. 10A-10D illustrate different feed roll flute spacing and angle designs. These illustrations are simplified, and do not show flute thickness or feed roll/flute curvature. FIG. 10A shows a flute spacing and angle such that the first flute 1001 ends directly opposite from where second flute 1003 begins, and flute 1003 ends directly opposite where flute 1005 begins. Thus, as the feed roll 200 turns, one flute is always ending as another is beginning and there are always two flutes dispensing at any given time. Phantom line 1007 indicates the location of the dispensing ledge 202 from FIG. 2. Here, the feed roll happens to be in a position where one flute ends and the next begins just as the dispensing ledge is crossed. At this point, the last feed is falling from above flute 1001 and half the feed between flutes 1003 and 1001 is being pushed over the ledge 1007 and dispensed.

If flute 1003 were removed from the feed roll 200 to create a design with more spacing between flutes, there would be some time during which feed between flutes 1005 and 1001 would be being pushed over the ledge 1007 by flute 1005 and no other flute was pushing feed across the ledge 1007. Thus, there would be only one flute dispensing at certain times (two flutes at other times), which would cause some irregularity to the flow due to the fact that at some times a flute would be taking up some of the volume passing over the dispensing ledge 1007, while at other times the volume passing over the ledge 1007 would be only feed. This effect is avoided when one flute ends opposite to where another begins.

Figure 10B:
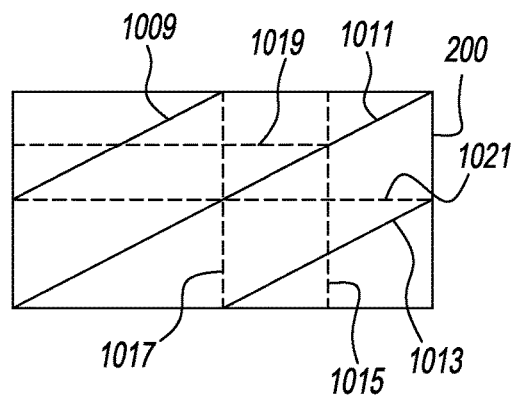

FIG. 10B shows a flute spacing and angle such that the first flute 1009 ends directly opposite from where third flute 1013 begins, with flute 1011 in between. Thus, as the feed roll 200 turns, one flute is always ending as another is beginning and there are always three flutes dispensing at any given time. Phantom line 1021 indicates the location of the dispensing ledge 202 from FIG. 2 relative to the feed roll 200. Here, the feed roll is in a position where one flute ends and the next begins just as the dispensing ledge is crossed. At this point, the last feed is falling from above flute 1009 and ¾ the feed between flutes 1011 and 1009 is being/has been pushed over the ledge 1021 and dispensed and ¼ the feed between flutes 1013 and 1011 is being/has been pushed over the dispensing ledge 1021 and dispensed.

Phantom line 1017 indicates the edge of the effective portion of the feed roll when half of it has been withdrawn from the feed cup. In that case, flute 1009 ends where flute 1011 begins, and two flutes are dispensing at any given time. Phantom line 1015 indicates the edge of the effective portion of the feed roll when a quarter of it has been withdrawn from the feed cup. In that case, flute 1009 does not end where another flute begins, and there will be some irregularity to the flow as there will sometimes be two flutes making up a portion of the volume passing over ledge 1021 and other times only one, as when dispensing ledge is located at phantom line 1019 relative to the feed roll 200.

Figure 10C:
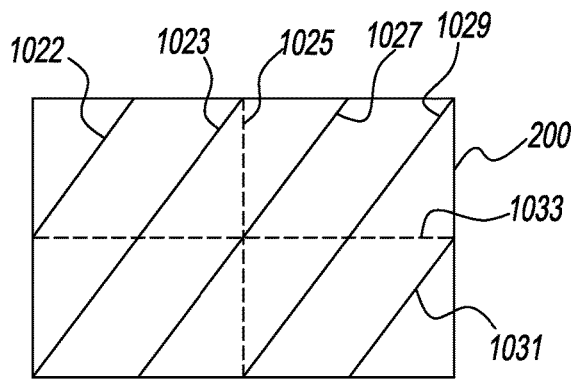
Figure 10D:
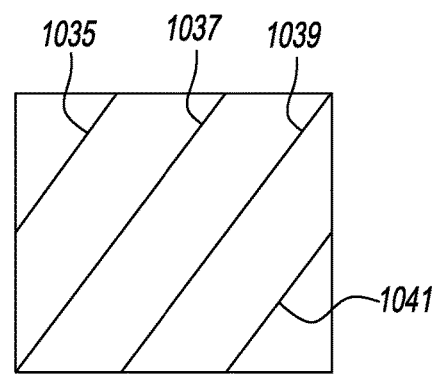

FIG. 10C shows a flute spacing and angle such that the first flute 1022 ends directly opposite from where filth flute 1031 begins, with flutes 1023, 1027 and 1029 in between. Thus, as the feed roll 200 turns, one flute is always ending as another is beginning and there are always five flutes dispensing at any given time. Phantom line 1033 indicates the location of the dispensing ledge 202 from FIG. 2 relative to the feed roll 200. Here, the feed roll is in a position where one flute ends and the next begins just as the dispensing ledge is crossed. At this point, the last feed is falling from above flute 1022 and the first of the feed between flutes 1031 and 1029 is being/has been pushed over the ledge 1033 and dispensed. This feed roll can be withdrawn ¼, ½, or ¾ without creating irregular flow. Using geometry, the feed roll can be designed to have this property for any given insertion fractions. FIG. 10D illustrates a comparable feed roll with flutes 1035, 1037, 1039, 1041 that can be withdrawn ⅓ or ⅔ without creating irregular flow.

Figure 11:
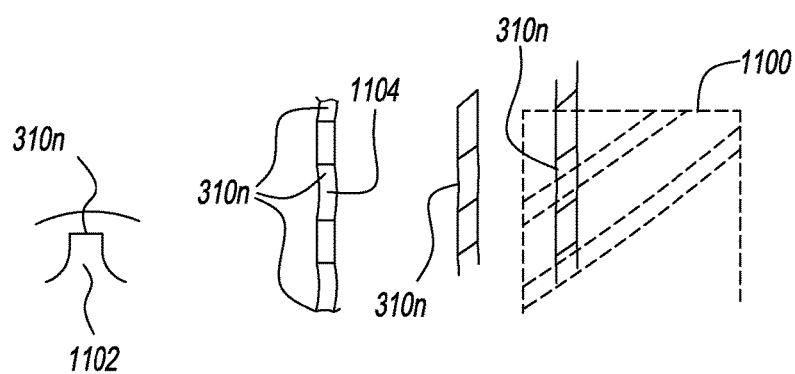
FIG. 11 illustrates horizontal and angles ring notches.

FIG. 11 is a side detail view showing side 1102 and top cut-away detail view showing thickness 1104 of straight and angled ring notches 310n. Phantom lines 1100 illustrate the relative position and angle of a feed roll in the illustrated embodiment. Here, the angle of the feed roll 1100 flutes matches the angle of ring notches 310n.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. For example, the feed roll described may be useful in any orifice-fed machine and with any type of feed. In other instances, well-known structures, components, systems, materials, or operations are not specifically shown or described in detail to avoid obscuring aspects of embodiments. While the embodiments may be illustrated by using a particular embodiment, this is not and does not limit the invention to any particular embodiment and a person of ordinary skill in the art will recognize that additional embodiments are readily understandable and are a part of the example embodiments.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What I claim is:

1. A method for dispensing feed, the method comprising:
   receiving feed within a feed cup of an agricultural machine;
   identifying a need to increase regularity of dispensed seed, and based on the identified need to increase regularity of dispensed seed, retrofitting the feed cup by replacing an existing feed roll having horizontal flutes in the feed cup with a helical feed roll comprising helical flutes and replacing an existing ring in the feed cup with a ring comprising notches corresponding in shape with the helical flutes of the feed roll;
   disposing the feed between the helical flutes of the helical feed roll configured to push the feed over a dispensing ledge within the feed cup, wherein a first one of the helical flutes terminates directly opposite where a second one of the helical flutes begins along the dispensing ledge;
   positioning the helical feed roll within the feed cup to adjust the size of an orifice within the feed cup;
   dispensing the feed at a rate proportional to the size of the orifice by rotating the helical feed roll;
   determining a need to dispense feed at a low rate;
   changing a first gear to a second gear to reduce a ratio between a rotational speed of the helical feed roll and a ground speed of the agricultural machine and thereby a rate of flow of dispensing feed at a given orifice size;
   inserting the helical feed roll at least halfway into the feed cup of the agricultural machine.

2. The method of claim 1, further comprising moving the feed roll within the feed cup by sliding it through the ring coupled to the feed cup in a direction perpendicular to the ring and thereby rotating the ring.

3. The method of claim 1, wherein an angle of each notch corresponds to the angle of each helical flute.

4. The method of claim 1, further comprising attaching a shield to extend built-in shielding of the feed cup to cover a portion of the helical feed roll and prevent flow of feed into the helical feed roll in an undesired direction.

5. The method of claim 1, wherein the dispensing feed comprises dispensing feed from a plurality of the helical flutes simultaneously.

6. The method of claim 1, further comprising determining a need for an increased rate of feed dispensing, and based on the determination of a need for an increased rate of feed dispensing, replacing the helical feed roll with a second helical feed roll comprising helical flutes, wherein the second helical feed roll has less total flute volume.

7. The method of claim 1, further comprising determining a need for an increased regularity of feed dispensing, and based on the determination of a need for an increased regularity of feed dispensing, replacing the helical feed roll with a second helical feed roll comprising helical flutes, wherein the flutes of the second helical feed roll are at a greater angle than the flutes of the helical feed roll.

8. The method of claim 1, further comprising determining a need for dispensing larger size feed, and based on the determination of a need for dispensing larger size feed, replacing the helical feed roll with a second helical feed roll comprising helical flutes, wherein the flutes of the second helical feed roll are spaced further apart than the flutes of the helical feed roll.

9. The method of claim 1, further comprising:
   identifying a need for an increased flow rate and, based on the identified need for an increased flow rate, replacing the helical feed roll with a second helical feed roll comprising helical flutes, wherein the second helical feed roll has, relative to the helical feed roll: a) reduced thickness of the helical flutes, b) increased length, c) increased circumference, d) decreased number of the helical flutes, or some combination of a, b, c and d.

10. The method of claim 1, further comprising:
    identifying a need for dispensing larger feed; and
    based on the identified need to dispense larger feed, replacing the helical feed roll with a second helical feed roll comprising helical flutes, wherein the second helical feed roll has, relative to the helical feed roll, a greater space between each flute.

11. The method of claim 1, further comprising:
    determining a need for a more regular flow of feed without changing the overall flow rate at which feed is dispensed; and
    based on the determined need for a more regular flow of feed without changing the overall flow rate at which feed is dispensed, replacing the helical feed roll with a second helical feed roll comprising helical flutes, wherein the second helical feed roll has, relative to the helical feed roll, an increased helical flute angle and reduced flute thickness.

12. The method of claim 1, further comprising:
    determining a need to dispense small feed; and
    based on the determined need to dispense small feed, replacing the helical feed roll with a second helical feed roll comprising helical flutes, wherein the second helical feed roll has, relative to the helical feed roll, more helical flutes at a higher angle than the helical feed roll to increase flow regularity while reducing flow rate.

13. The method of claim 1, further comprising identifying that the feed cup would allow feed to flow into the feed roll down the helical flutes in a direction opposite a direction of rotation of the helical feed roll and, based on that identification, attaching a removable shield to the feed cup to cover a portion of the helical feed roll and prevent flow of feed into the helical feed roll in the direction opposite the direction of rotation of the helical feed roll.

* * * * *